(12) United States Patent
Reddy et al.

(10) Patent No.: US 8,161,052 B2
(45) Date of Patent: Apr. 17, 2012

(54) INFORMATION MODULE RECOMMENDATION

(75) Inventors: Prakash Reddy, Fremont, CA (US); Rajan Lukose, Oaklane, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 426 days.

(21) Appl. No.: 12/243,035

(22) Filed: Oct. 1, 2008

(65) Prior Publication Data

US 2010/0082659 A1    Apr. 1, 2010

Related U.S. Application Data

(60) Provisional application No. 61/024,834, filed on Jan. 30, 2008.

(51) Int. Cl.
*G06F 7/00*    (2006.01)

(52) U.S. Cl. .................................................. 707/748
(58) Field of Classification Search ................. None
See application file for complete search history.

(56) References Cited

U.S. PATENT DOCUMENTS

| | | | |
|---|---|---|---|
| 2006/0155764 A1* | 7/2006 | Tao | 707/104.1 |
| 2009/0125934 A1* | 5/2009 | Jones et al. | 725/28 |

* cited by examiner

*Primary Examiner* — Truong Vo

(57) ABSTRACT

A method of information module recommendation is provided. The method comprises collecting a first set of user information associated with a user from an electronic device that is associated with the user, and identifying an information topic associated with the first set of user information. The method further comprises accessing a module database comprising a plurality of information modules, identifying an information module from among the plurality of information modules configured to deliver information pertaining to the information topic, and recommending the information module to the user.

20 Claims, 14 Drawing Sheets

1200

```
COLLECT A FIRST SET OF USER INFORMATION ASSOCIATED WITH
A USER FROM AN ELECTRONIC DEVICE ASSOCIATED WITH THE
USER
1210
          ↓
INDENTIFY AN INFORMATION TOPIC ASSOCIATED WITH THE FIRST
SET OF USER INFORMATION
1220
          ↓
ACCESS A MODULE DATABASE THAT INCLUDES MULTIPLE
INFORMATION MODULES
1230
          ↓
INDENTIFY AN INFORMATION MODULE FROM AMONG THE
MULTIPLE INFORMATION MODULES THAT IS CONFIGURED TO
DELIVER INFORMATION PERTAINING TO THE INFORMATION TOPIC
1240
          ↓
RECOMMEND THE INFORMATION MODULE TO THE USER
1250
```

FIG. 12

INFORMATION MODULE RECOMMENDATION

CROSS REFERENCE TO RELATED APPLICATIONS

This Application claims the benefit of U.S. Provisional Application Ser. No. 61/024,834, filed Jan. 30, 2008, titled "Information Module Recommendation" which is hereby incorporated by reference herein as if reproduced in full below.

TECHNICAL FIELD

The technology relates to the field of communications using information modules.

BACKGROUND

Modern communication systems are utilized to communicate information from a source to a destination. Oftentimes, an amount of recognizable content is transferred such that the communication is able to provide information that is useful to the receiver of the communication. Moreover, when multiple sources of information are available, an information receiver may be presented With a choice regarding which communications the receiver will receive or accept, and this choice may be decided based on the information content associated with such communications, such as the value of such content to the receiver.

Information may be communicated in various ways, such as audibly, optically, or electronically. Due to the ability of many modern computer systems to process electronic data at a relatively high rate of speed, such computer systems have become a useful tool for communicating information electronically. Indeed, various electronic communication systems, such as the World Wide Web ("Web"), are utilized to facilitate the communication of information across relatively large distances around the world.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

A method of information module recommendation is provided. The method comprises collecting a first set of user information associated with a user from an electronic device that is associated with the user, and identifying an information topic associated with the first set of user information. The method further comprises accessing a module database comprising a plurality of information modules, identifying an information module from among the plurality of information modules configured to deliver information pertaining to the information topic, and recommending the information module to the user.

DESCRIPTION OF THE DRAWINGS

The accompanying drawings, which are incorporated in and form a part of this specification, illustrate embodiments of the technology for information module recommendation, and together with the description, serve to explain principles discussed below:

FIG. 12 is a flowchart of an exemplary method of information module recommendation used in accordance with an embodiment of the present technology.

Figure 1:
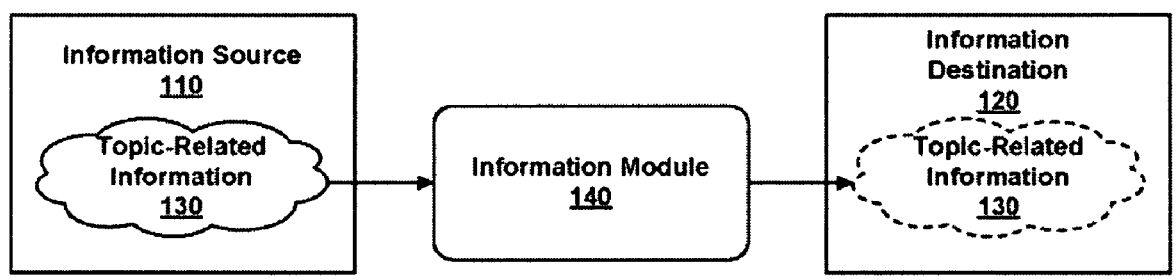
FIG. 1 is a block diagram of an exemplary communication system used in accordance with an embodiment of the present technology.

The drawings referred to in this description are to be understood as not being drawn to scale except if specifically noted.

DETAILED DESCRIPTION

Reference will now be made in detail to embodiments of the present technology for information module recommendation, examples of which are illustrated in the accompanying drawings. While the present technology for information module recommendation will be described in conjunction with various embodiments, the present technology is not limited to these embodiments. On the contrary, the present technology for information module recommendation is intended to cover alternatives, modifications and equivalents, which may be included within the spirit and scope of the various embodiments as defined by the appended claims.

Furthermore, in the following detailed description, numerous specific details are set forth in order to provide a thorough understanding of the present technology for information module recommendation. However, the present technology for information module recommendation may be practiced without these specific details. In other instances, well known methods, procedures, components, and circuits have not been described in detail so as not to unnecessarily obscure aspects of the presented embodiments.

Overview

Various modern communication systems are integrated with user interfaces that function as gateways between a particular user and a communication network. For example, these gateways receive a request for data from the user, locate the data within the network and/or return the requested data to the user. However, the amount of information that is accessible within a given information network may be relatively voluminous, and forcing the user to constantly searching for specific information of interest may be quite laborious and time-consuming.

An embodiment utilizes one or more information modules to provide a user with access to specific information of interest to the user. Specific information of interest to the user is identified, such as information pertaining to a specific information topic, and an information module that specializes in locating such topic-related information is added to an information portal that provides a gateway between the user and an information network.

In addition, an embodiment provides that a specific information module of potential interest to a user is identified and recommended to the user. In particular, a set of user information associated with a specific user is collected from a device utilized by such user. Next, an information topic associated with this user information is identified, and a particular information module from among a group of available modules is identified as being configured to deliver information pertaining to the relevant information topic. Finally, the identified information module is recommended to the user such that the user has the option of adding this content-specific information module to the user's portal.

The foregoing notwithstanding, pursuant to one embodiment, multiple information modules are identified as being associated with a specific information topic, and a ranking paradigm is implemented so as to identify one or more information modules that are most pertinent to the specific information of interest to the user. For example, the degree to which a group of available modules is related to such topic is assessed, and these modules are ranked based on the results of this assessment. Next, one or more of the ranked modules are identified as being most pertinent to the information topic of interest based on the results of the aforementioned ranking process, and are then recommended to the user.

In an embodiment, if an information module is recommended to the user, and the user rejects this recommendation, the recommendation is changed so as to cease recommending the rejected module. However, if the user accepts the proffered recommendation, the accepted module is automatically provided to the user, such as by adding such module to the user's information portal.

In accordance with one embodiment, however, a default rejection is provided. For example, a module recommendation is provided to the user, wherein the user has the option of accepting or rejecting the recommended module. If after a certain period of time such module is neither accepted nor rejected, the recommendation of this module is removed, revoked or updated such that the same module is not continually offered to a user who is not interested in the recommendation. Moreover, this default rejection scheme allows new module recommendations to be made over time, even in the absence of a user-implemented rejection.

Reference will now be made to exemplary embodiments pertaining to the generation, recommendation and implementation of information modules. While the present technology may be described in conjunction with various embodiments discussed herein, the present technology is not limited to these embodiments. Rather, the present technology is intended to cover alternatives, modifications and equivalents of the presented embodiments.

Information Modules

Communication systems are often utilized to communicate information from a source to a destination. Such information man be communicated in different ways. For example, an amount of recognizable content may be transferred to a receiver either audibly, optically, or electronically. Once received, this information content may be utilized to provide information that is useful to a user of the communication system.

In an embodiment, information modules are utilized to provide a user with access to useful information. These information modules are functional portals configured to deliver such useful information to a destination or provide a service, such as providing a link to particular portions of information that are of interest to a person or system interacting with these modules.

With reference now to FIG. 1, an exemplary communication system 100 in accordance with an embodiment is shown. Communication system 100 includes an information source 110 and an information destination 120, wherein topic-related information 130 is acquired from information source 110 and transmitted to information destination 120 using an information module 140.

In an embodiment, topic-related information 130 is generated at information source 110. Consider the example where information source 110 receives information from one or more external sources, such as an electronic data server, and then compiles such information into a new format. Consequently, topic-related information 130 includes information that has been reformatted, such as in a format that is recognizable or useful to information destination 120.

In an alternative embodiment, topic-related information 130 is generated externally to information source 110, and this topic-related information 130 is transmitted to information source 110 so as to provide one or more information destinations, such as information destination 120, with access to topic-related information 130. Consider the example where, information source 110 includes an information database used to magnetically or electronically store data. Topic-related information 130 is provided to information source 110 and stored in this information database such that the stored information is accessible to information destination 120. In this manner, information destination 120 is able to access and acquire topic-related information 130 from information source 110.

The foregoing notwithstanding, an embodiment provides that information source 110 is utilized to route information to information destination 120. Consider the example where information source 110 includes a data transmission medium, such as a wireline medium wherein data is transmitted optically or electronically. Topic-related information 130 is generated externally to information source 110, and is then transmitted to information source along this data transmission medium.

The foregoing notwithstanding, the present technology is not limited to wireline communications. Indeed, an embodiment provides that topic-related information 130 is transmitted to information destination 120 using one or more wireless communication technologies.

With reference still to FIG. 1, information module 140 collects topic-related information 130 from information source 110 and then provides this topic-related information 130 to information destination 120. In one example, information module 140 is a software module that is configured to receive a request from information destination 120 for information pertaining to a specific topic. In response to this request, information module 140 accesses topic-related information 130 from information source, wherein topic-related information 130 is magnetically or electronically stored, and provides this topic-related information 130 to information destination 120.

In an embodiment, information source 110 is a wireless communication network, or a portion thereof, and information module 140 is communicatively coupled with this wireless network. For example, information module 140 functions as a gateway to this wireless communication network wherein information module 140 is configured to recognize the data transfer protocol utilized by the network. Information module 140 requests specific data from within the network and receives such data in response to such request. Moreover, information module 140 converts this data into a format that is recognizable to information destination 120 before communicating the received information to information destination 120.

Thus, an embodiment provides that information module 140 functions as a communicative gateway between information source 110 and information destination 120. However, pursuant to one embodiment, information module 140 is further configured to identify or provide particular information of interest to information destination 120. In particular, information module 140 provides a gateway to topic-related information 130 based on the information topic or subject matter associated with topic-related information 130.

For example, information accessed by information destination 120 over a period of time is analyzed so as to identify a subject matter of such information. This subject matter is then associated with one or more related topics. Finally, information module 140 is used to provide information associated with one or more of these identified information topics to information destination 120. In this manner, a topic of interest to information destination 120 is identified, and information module 140 is utilized to locate information pertaining to this topic and provide this information to information destination 120.

Exemplary Module Implementations

Figure 2:
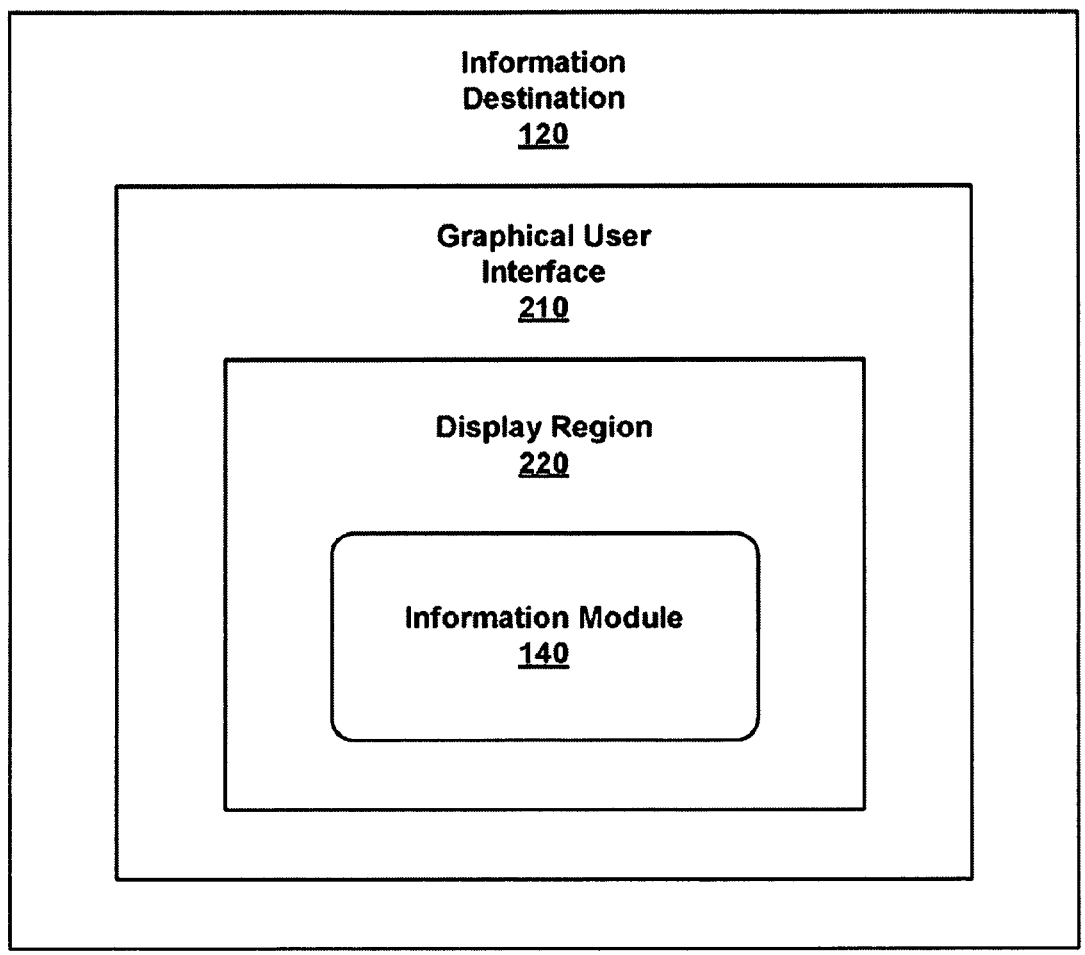
FIG. 2 is a block diagram of an exemplary information display system used in accordance with an embodiment of the present technology.

With reference now to FIG. 2, an exemplary information display system 200 in accordance with an embodiment is shown. Information destination 120 includes or utilizes a graphical user interface 210 for displaying data to a user. In particular, graphical user interface 210 includes a display region 220, which may encompass all or a portion of graphical user interface 210, and information is displayed within display region 220.

For example, with reference again to FIG. 1, once information destination 120 receives topic-related information 130 from information module 140, information destination 120 converts topic-related information 130 into a format that may be visually displayed to a user using graphical user interface 210. Subsequent to this conversion process, topic-related information 130 is provided to graphical user interface 210, which displays topic-related information 130 in display region 220.

The foregoing notwithstanding, the present technology is not limited to the visual display of topic-related information 130. Indeed, pursuant to one embodiment, topic-related information 130 may be communicated to a user in a non-visual format. To illustrate, an example provides that information destination 120 utilizes a user interface that is non-graphical, such as an audio interface. Topic-related information 130 is transmitted to information destination 120, and this interface is utilized to communicate this topic-related information to a user, such as in an audio format that is recognizable to the user.

With reference again to FIG. 2, an embodiment provides that information module 140 is a graphical information module that is utilized to graphically represent information within display region 220. Consider the example where information module 140 functions as a visual gateway to information pertaining to a specific topic. By viewing and/or interacting with information module 140 in display region 220, a user who is interested in such topic is able to obtain this information.

Different methods may be implemented for providing access to information using a graphical information module. For example, an embodiment provides that information module 140 includes a link to a particular portion of information. When a user selects this link, such as by clicking the link using an electronic mouse and cursor, the portion of information is displayed within information module 140. In an alternative embodiment, however, selection of this information link causes a different application, portal or window to open within graphical user interface 210, and this application is used to display or otherwise communicate the selected portion of information to the user.

Moreover, pursuant to one embodiment, multiple information modules are displayed in display region 220, wherein each of these information modules is configured to provide a user with access to different topic-related information. In this manner, information may be separated by topic and/or subject matter, with different types of information being made accessible to the user by different information modules. This allows for an organized and efficient approach to information deliver. In particular, a user interested in a specific topic is able to more easily locate information related to this topic by locating an information module in display region 220 associated with the same or similar content as the topic of interest to the user.

Figure 3A:
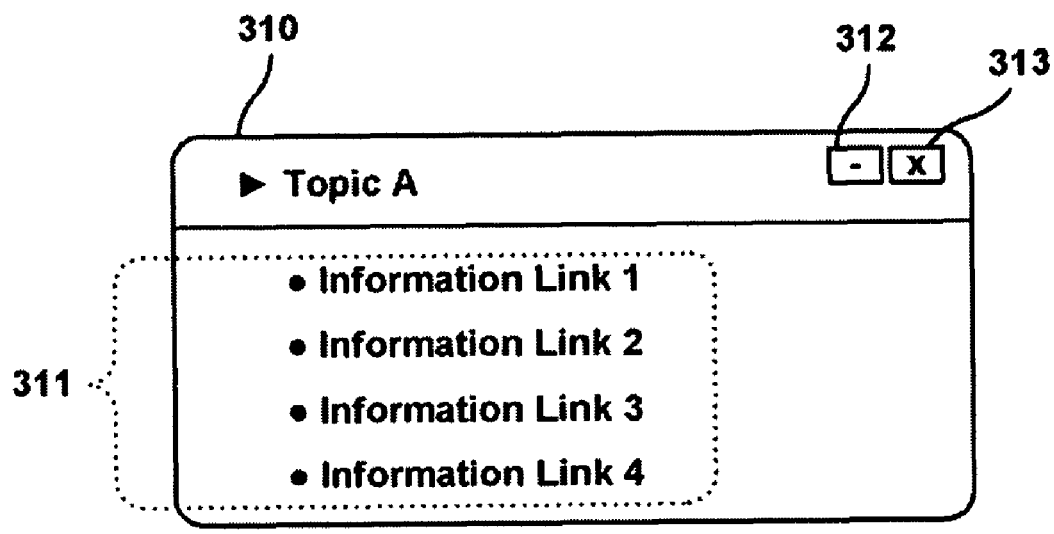
FIG. 3A is a diagram of a first exemplary information module configuration used in accordance with an embodiment of the present technology.

With reference now to FIG. 3A, a first exemplary information module configuration 300 in accordance with an embodiment is shown. First exemplary information module configuration 300 includes a first information module 310 that is configured to provide a user with access to information related to a first information topic, referred to as "Topic A". First information module 310 includes one or more information links 311 that a user may select to gain access to a specific piece of information related to "Topic A". Consider the example where first information module 310 is a graphical information module displayed in display region 220, as shown in FIG. 2. A user selects a specific information link within first information module 310, such as by clicking the link using an electronic mouse cursor, and the user is provided with information related to that link.

Thus, an embodiment provides that a single information module includes multiple information links such that a user may gain access to different categories of information. In this manner, a single information module may be implemented so as to provide information related to a single topic, while simultaneously providing information related to different categories of information, wherein each information category is related to the aforementioned topic.

To illustrate, an example provides that first information module 310 is configured to provide access to information related to sports news. First information module 310 includes multiple information links, %%herein each of these information links is configured to provide access to news related to a different sporting event. For example, when a user clicks on a first link, the user is provided information pertaining to a recent professional basketball game, and when a user clicks on a second link, the user is able to access information related to a recent football game. Thus, an embodiment provides that a single information module is utilized to simultaneously provide access to different categories of information, wherein each information category is related to the same general information topic.

In one embodiment, one or more information links 311 are configured to provide access to a particular Internet or Web page of interest to the user. Consider the example where one or more information links 311 are Internet hyperlinks. When a user clicks on a particular hyperlink, a Web page is displayed to the user, such as in graphical user interface 210 shown in FIG. 2. The displayed Web page contains information content of interest to the user. Moreover, the hyperlink that provides access to this Web page is labeled in first information module 310 so as to provide the user with notice as to the subject matter of the information content of the corresponding Web page. In this manner, a user is able to utilize first information module 310 and one or more information links 311 located therein to easily navigate to specific content of interest to the user.

With reference still to FIG. 3A, first information module 310 optionally includes a "minimize" button 312 and a "close" button 313. When a user clicks on "minimize" button 312, a graphical representation of first information module 310 within display region 220 is minimized such that first information module 310 occupies less space within displays region 220. However, once first information module 310 has been minimized Within display region 220, first information module 310 continues to operate. In contrast, when a user clicks on "close" button 313, first information module 310 is closed such that first information module 310 no longer functions within display region 220. Therefore, an embodiment provides that one or more control functions are associated with an information module so as to allow a user to customize an appearance of graphical user interface 210 in FIG. 2.

Figure 3B:
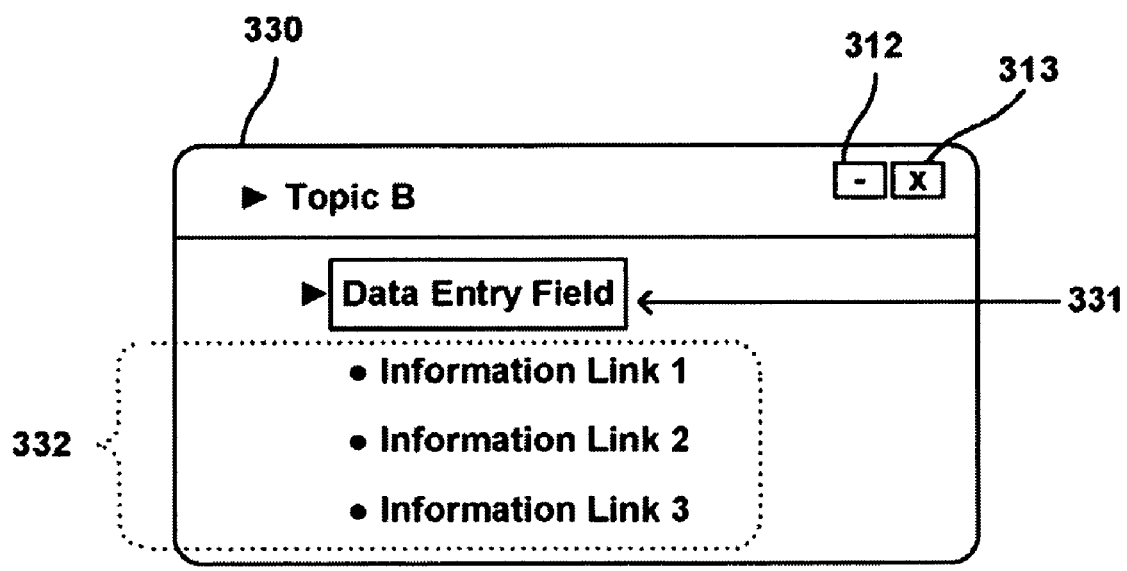
FIG. 3B is a diagram of a second exemplary information module configuration used in accordance with an embodiment of the present technology.

With reference now to FIG. 3B, a second exemplary information module configuration 320 in accordance with an embodiment is shown. Second exemplary information module configuration 320 includes a second information module 330 configured to provide a user with access to information pertaining to a second information topic, referred to as "Topic B". Second information module 330 is further configured to acquire a data entry in a data entry field 331, and provide amuser with access to information related to "Topic B" that is customized according to the content specified by the received data entry.

For example, a user selects data entry field 331, and then enters a data entry into data entry field 331 using a data entry device, such as a keyboards which is coupled with information destination 120 so as to provide user-inputted data to information destination 120, such as alphanumeric, symbolic, or functional information. The inputted data entry describes or labels a topic of interest to the user. After this information has been inputted into data entry field 331, second information module 330 returns one or more data-related information links 332 that are configured to provide the user with links to information related to the inputted data entry. In this manner, second information module 330 is configurable so as to provide a user with customizable information links.

Figure 3C:
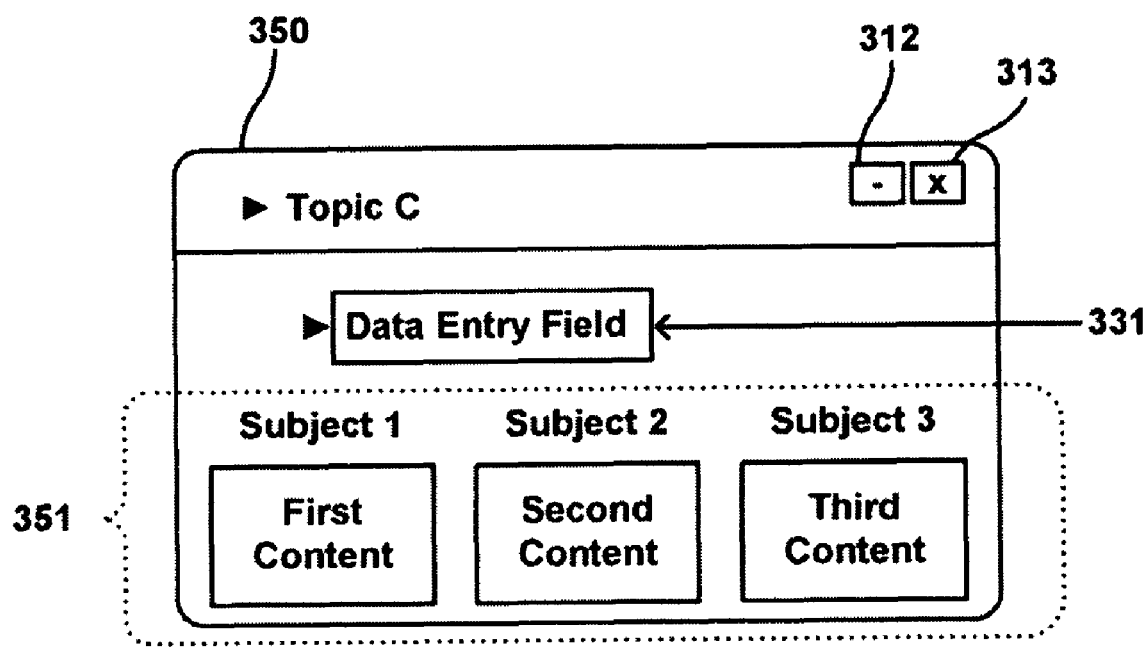
FIG. 3C is a diagram of a third exemplary information module configuration used in accordance with an embodiment of the present technology.

With reference now to FIG. 3C, a third exemplary information module configuration 340 in accordance with an embodiment is shown. Third exemplary information module configuration 340 includes a third information module 350 configured to display information to a user. In particular, third information module 350 is configured to display information pertaining to a third information topic, referred to as "Topic C".

Third information module 350 includes one or more data display fields 351 used to displays content-specific information to a user. For example, a first data display field in third information module 350 is used to display information pertaining to a first information content. Moreover, this data display field is labeled "Subject 1" so as to communicate to a user the subject matter of the displayed information content. Thus, an embodiment provides that an information module is utilized to display information to a user without the user clicking on an information link.

With reference still to FIG. 3C, third information module 350 optionally includes data entry field 331. A data entry is inputted into data entry field 331, and third information module 350 tailors one or more data display fields 351 to display content associated with the received data entry. Consider the example where third information module 350 is used to display weather-related information to a user. A user enters a geographical location into data entry field 331, and third information module 350 utilizes one or more data display fields 351 to display weather information pertaining to the specified geographical location.

Figure 4:
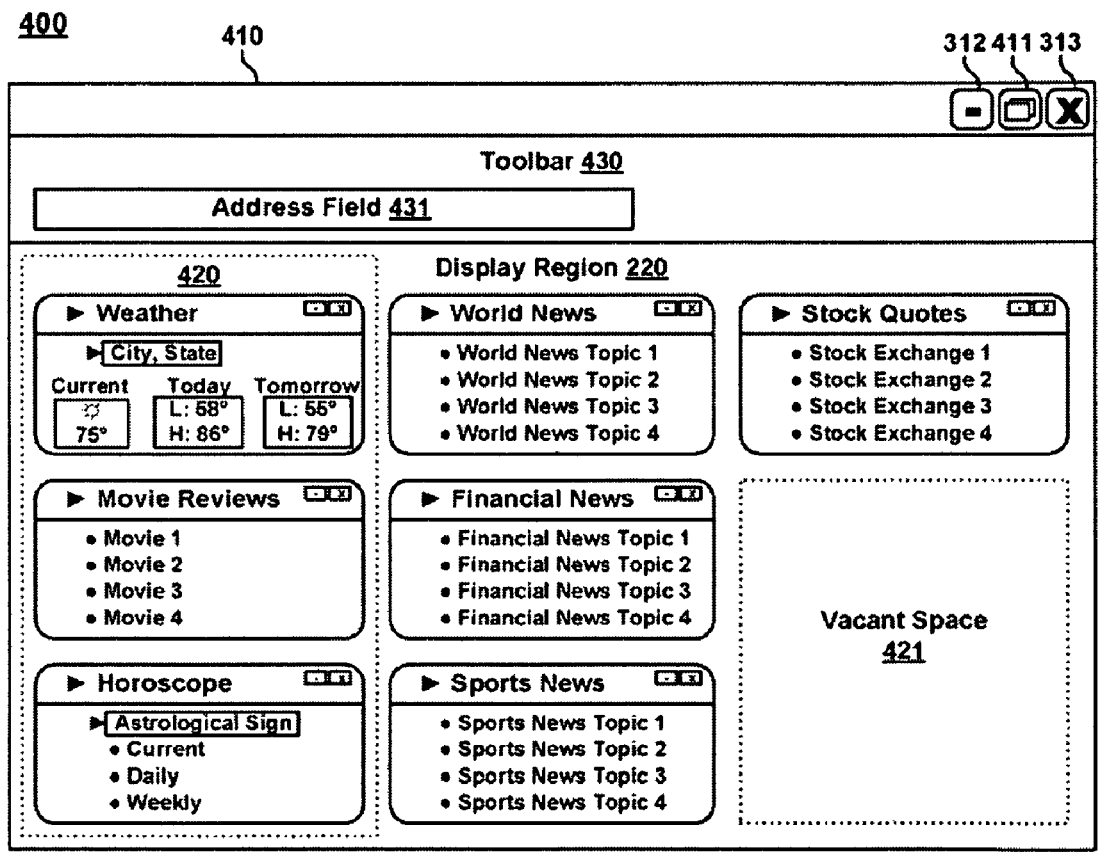
FIG. 4 is a diagram of a first exemplary display configuration used in accordance With an embodiment of the present technology.

With reference now to FIG. 4, a first exemplary display configuration 400 in accordance with an embodiment is shown. First exemplary display configuration 400 includes a software application window 410 that acts as a gateway between a user and one or more information modules. In particular, software application window 410 functions as a graphical interface that allows a user to interact with a software application associated with software application window 410. For example, software application window 410 may be displayed to a user using a user interface, such as graphical user interface 210 in FIG. 2. Moreover, software application window 410 includes a display region 220 for displaying one or more information modules to a user, such as exemplar information modules 420.

With reference still to FIG. 4, software application window 410 includes a "minimize" button 312 and a "close" button 313, wherein execution of "minimize" button 312 minimizes an appearance of software application window 410 in graphical user interface 210, and wherein execution of "close" button 313 functions to close software application window 410 such that a software application associated with software application window 410 ceases to utilize graphical user interface 210. Moreover, software application window 410 further includes a toolbar 430 that provides a user with one or more tools for interacting, with software application window 410.

In an embodiment, multiple information modules are displayed in display region 220, wherein each of the displayed information modules is configured to provide a user with access to different content-related information. In this manner, software application window 410 functions as a comprehensive information portal. Moreover, in one embodiment, this information portal is customizable. For example, a user may decide to minimize or close one or more information modules in display region 220 and/or add one or more new information modules. This allows software application window 410 to be tailored so as to display one or more information modules of interest to the user.

To further illustrate, and with reference again to FIG. 4, a number of information modules are displayed in display region 220, such as exemplary information modules 420. However, a vacant space 421 is also present within display region 220. Therefore, in order to more efficiently utilize space within display region 220, an embodiment provides that one or more additional information modules are selected to be displayed in vacant space 421. In this manner, the amount and selections of information provided to a user may be increased.

First exemplary display configuration 400 may be implemented using various software applications. In one embodiment, software application window 410 is associated with an Internet or Web browser application. To illustrate, and with reference again to FIG. 4, toolbar 430 includes an address field 431. When a user inputs an Internet or Web address into address field 431, the browser application retrieves the Internet or Web page associated with this address, and software application window 410 displays this page in display region 220.

Furthermore, an embodiment provides that one or more information modules, such as exemplary information modules 420, are embedded in an Internet or Web page. The browser application, or an information server communicating therewith, dynamically retrieves these information modules along with the associated Internet or Web page. Next, the browser application outputs this data to software application window 410, which displays the Internet or Web page in display region 220, along with the embedded information modules.

Module Generation and Rule Specification

Figure 5:
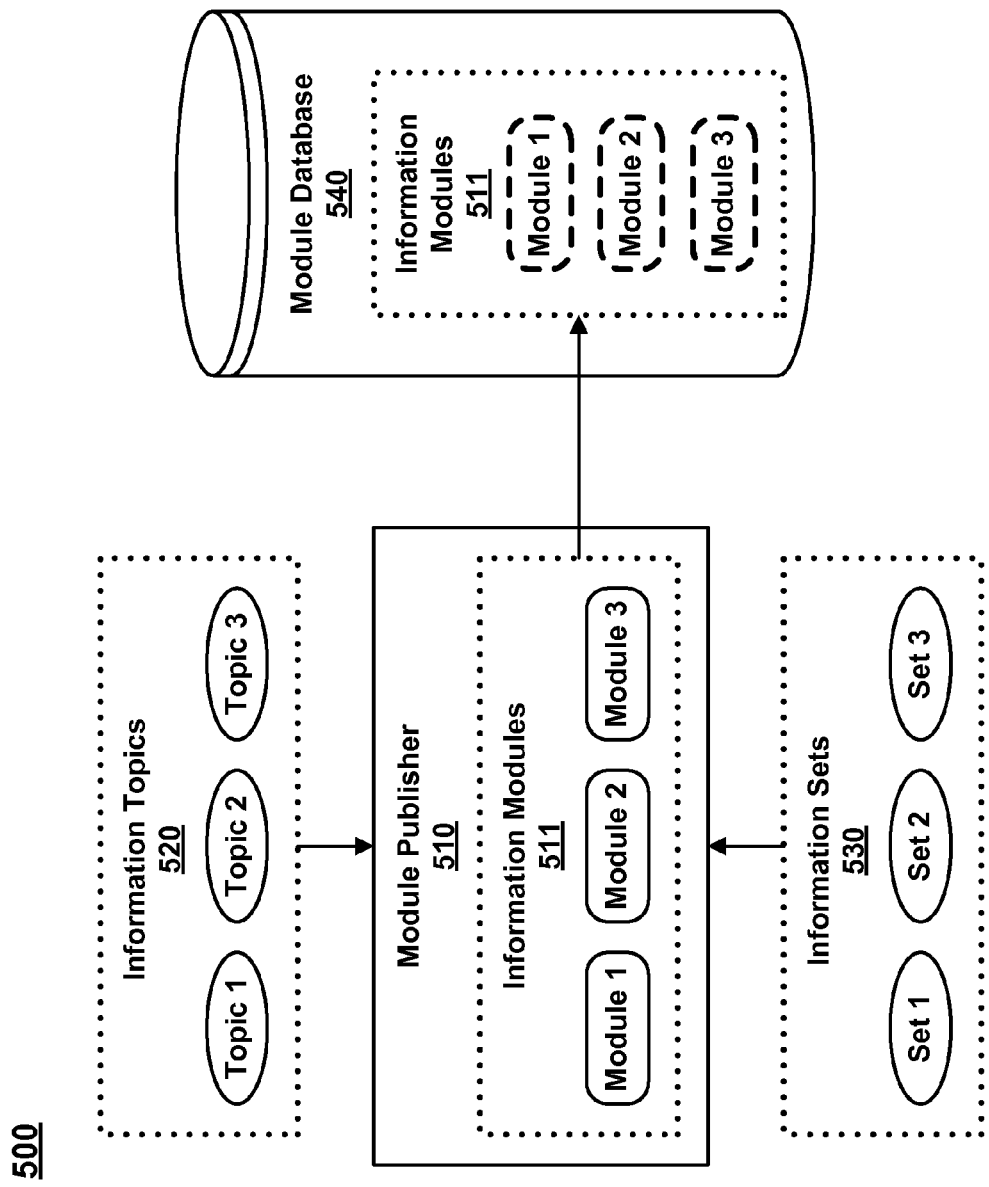
FIG. 5 is a block diagram of an exemplary information module generation system used in accordance with an embodiment of the present technology.

With reference now to FIG. 5, an exemplary information module generation system 500 in accordance with an embodiment is shown. A module publisher 510 accesses a set of information topics 520 and generates or develops a set of information modules 511 that are configured to provide access to information pertaining to these information topics 520. In this manner, information modules 511 are designed to function as gateways to topic-relating information content.

In one embodiment, module publisher 510 further accesses various information sets 530. Module publisher 510 analyzes the information content associated with information sets 530, and then maps each information set to one or more information topics from among information topics 520 that are associated with the information content of the aforementioned information set. Module publisher 510 then categorizes information sets 530 according to their corresponding information content, and generates information modules 511 such that these information modules 511 are configured to provide access to information sets 530.

To illustrate, an information set includes a published article discussing a new invention and its potential utility to society. This invention has never existed before, so an information module dedicated to delivering information related to this new technology has not been previously created. Thus, module publisher 510 analyzes the content of this article and determines that a module dedicated to this new topic does not exist. In response, module publisher creates a new information module that is configured to provide access to information pertaining to the newly invented technology and/or related endeavors.

The foregoing notwithstanding, two or more information modules may be configured to provide access to the same information, even though these modules are associated with different information topics. For example, an information set includes a published article about a recent sporting event. In particular, the published article discusses a local high school basketball game. Module publisher 510 recognizes that the published article is related to multiple information topics, such as local news, basketball-related news, and high school sporting events. As a result, module publisher 510 generates three different information modules that focus on the three aforementioned categories of information, respectively. Each of these information modules are provided with a copy of the published article, or a link thereto, so as to provide different topic-related gateways to the same information.

With reference still to FIG. 5, once module publisher 510 has generated information modules 511, these information modules 511 are stored in a module database 540. In this manner, information modules 511 may be accessed at a subsequent point in time. For example, these information modules 511 exist as windows of functionality that may be accessed and then added to a portal page, such as software application window 410.

Thus, various embodiments provide that topic-specific information modules are defined and developed, such as by a module publisher or developer, and these modules are then made available to users. Moreover, an embodiment provides that a published module is designed to follow or adhere to a specific information mapping protocol. This mapping protocol may then be used to map a specific module to a particular user and/or dynamically update the information content that is mapped to such module.

Consider the example where information modules 511 are mapped to specific information category/subcategory pairs. In particular, each information module is categorized based on the subject matter of the information content associated with the module and according to a set of defined information categories. Each of these information categories has a unique identifier and collection of descriptive terms that may be used to identify a particular module based on an information topic of interest to a user. In addition, each category, is associated with its oxen collection of information subcategories, wherein the information content associated with each subcategory is related to the subject matter of the broader information category. As a result, one or more information modules of interest may be identified based on the identification of a particular category and/or subcategory of interest.

To further illustrate, a module developer, such as module publisher 510, is utilized to generate a set of matching rules that ma) be used to identify one or more category/subcategory pairs associated with a particular information module. These rule sets are used to map each module from among information modules 511 to a set of information categories and/or subcategories that correspond to the information topic associated with the module. In this manner, new information associated with such category/subcategory pairs may be easily associated with a particular information module, and information modules 511 may be continually and dynamically updated over time so as to provide a user with access to this new information.

Thus, an embodiment provides that each module from among information modules 511 is affiliated with a unique set of associated mapping rules. These rules mall be based on the informational search parameters associated with an individual module, and may be implemented to map new information to the module so as to dynamically increase the module's utility to a user.

Although the aforementioned information mapping criteria has been described in the context of subject matter specific category/subcategory pairs, the present technology is not limited to this exemplary mapping paradigm. Indeed, other information mapping models may also be implemented.

Module Recommendation

Systems and methods of generating and implementing various information modules have been described herein. However, when the number of available information modules increases to the point that all or a significant portion of these modules cannot be simultaneously provided to a user in a usable format, an embodiment provides that a module selection process may be implemented so as to select those information modules that are of most interest and/or use to a particular user. In one example, this selection process is manual, wherein the user manually analyzes the available information modules and decides which information modules are of most interest to the user and which modules are of little or no value.

Alternatively, an embodiment provides an automated module selection process, wherein the interests of the user are analyzed, and one or more information modules are identified as correlating with such user interests. The results of this automated selection process are then communicated to the user, who has the option of interacting with the selected modules, or dismissing the results of the selection process. Thus, in a communication network having an ever-increasing number of available information modules, this automated process provides a valuable tool for identifying modules of interest to a user in a relatively quick and efficient manner.

Consider the example where hundreds of different information modules are available to a user through a communication network. Attempting to manually analyze the capabilities of each individual module would be an arduous and time-consuming task. In contrast, an embodiment utilizes the aforementioned automated module selection process to identify user actions, such as user-implemented actions on a personal computer that is communicatively coupled with the network, and these actions are mapped to information modules corresponding to a subject matter associated with such actions. These modules are then recommended to the user such that the user is presented with the option of accepting one or more of the recommended modules rather than engaging in the laborious task or manually analyzing each available module.

Various exemplary information module recommendation systems will now be discussed. However, although various embodiments pertaining to these exemplary systems are disclosed herein, the present technology is not limited to these embodiments. Rather, the following embodiments are intended to illustrate various implementations of exemplary module recommendation paradigms.

Figure 6:
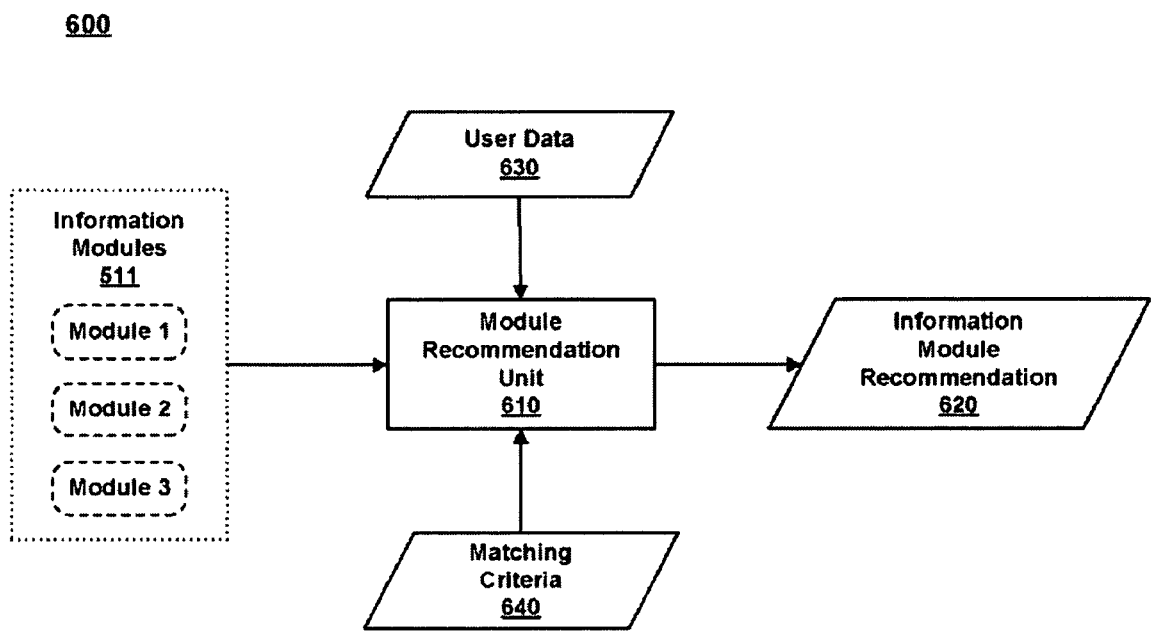
FIG. 6 is a block diagram of a first exemplary information module recommendation system used in accordance with an embodiment of the present technology.

With reference now to FIG. 6, a first exemplary information module recommendation system 600 in accordance with an embodiment is shown. First exemplary information module recommendation system 600 includes a module recommendation unit 610 used to generate an information module recommendation 620 that recommends a particular information module from among information modules 511. In particular, module recommendation unit 610 acquires a set of user data 630, and maps this user data 630 to a particular information module using a matching criteria 640.

Therefore, an embodiment provides that module recommendation unit 610 is utilized to analyze user data 630 and recommend an information module to a user of an electronic device based on the content of user data 630. Different methods may be employed for analyzing user data 630 so as to identify modules of potential interest to a user.

Pursuant to one embodiment, the information content that a user accesses provides a basis for identifying an information topic of interest to the user. For example, a user utilizes an electronic device to access information over the Internet. The content that the user accesses, such as Web pages within a specific Internet domain, is tracked and analyzed so as to identify specific portions of information that the user is most likely to access over a given period of time. One or more information modules associated with this specific information may then be identified and recommended to the user.

In an alternative embodiment, a behavioral pattern associated With the user is identified, and this pattern provides a basis for identifying an information topic of interest to the user. For example, user data 630 details a number of interactions of a user with a particular electronic device. Module recommendation unit 610 identifies these user actions, and analyzes the substance of these actions to identify a behavioral pattern associated with the user. This behavioral pattern is then used to identify information of potential interest to the user.

To further illustrate, consider the example where a user utilizes a Web browser to access a Web-based search engine. The user inputs a specific subject of interest to the user, and the search engine returns a list of search results associated with the inputted subject matter. Module recommendation unit 610 tracks these user-implemented search queries, and generates a user profile that details the user's search behavior. This user profile may then be utilized by module recommendation unit 610 to identify one or more information modules of potential interest to the user, or may be saved in an information database such that the profile is available to be aggregated with other user data at a subsequent point in time.

The foregoing notwithstanding, in one example, a user may utilize a particular computer application for specific purposes, while using other applications for different purposes. Thus, an embodiment provides that module recommendation unit 610 takes into consideration a user's interactions with various different applications within a computer system. For example, a user's Web-related behavior as well as the user's interactions with other computer applications, such as a personal task-managing program, are tracked and compiled so as to provide a more comprehensive basis for identifying information of interest to the user.

Furthermore, in an embodiment, various driver applications and/or hardware configurations associated with an electronic device utilized by a user are identified by module recommendation unit 610. Consider the example where a printer that is implemented with the electronic device utilizes a specific device driver application in order to interact with the device. As new device driver applications become available, wherein such applications are compatible with both the electronic device and the implemented printer, this information may be earmarked as information of potential interest to the user.

With reference again to FIG. 6, module recommendation unit utilizes matching criteria 640 to map user data 630 to one or more information modules from among information modules 511. Matching criteria 640 includes a set of matching rules that guides module recommendation unit 610 during the mapping process, such as the matching rules developed by module publisher 510 in FIG. 5. In particular, an embodiment provides that module recommendation unit 610 accesses user data 630, and utilizes matching criteria 640 to map user data 630 to a particular information module based on an information topic associated with both user data 630 and the information module. Module recommendation unit 610 may then recommend the information module to the user in response to this mapping.

For example, information modules 511 are associated with corresponding category/subcategory pairs. Module recommendation unit 610 accesses user data 630 and maps the identified user actions to appropriate category/subcategory pairs. Moreover, matching criteria 640 is used to map these categorized user actions to specific information modules associated with the same or similar category/subcategory pairs. Thus, when a module specifies a particular category/subcategory pair as part of its rule set, and it is determined that a relatively high probability exists that the user may be interested in that particular category/subcategory pair, then matching criteria 640 is utilized to flag the aforementioned module as an information module of potential interest to the user.

Once multiple information modules of potential interest to the user are identified, one or more of these modules may be recommended to the user. Pursuant to one embodiment, these modules are ranked so as to identify one or more of these modules that are most likely to appeal to the user. In this manner, the module recommendation process may be streamlined so as to increase the efficiency and effectiveness of the recommendation process.

In an embodiment, the ranking process includes associating an individual matching count with each information module, and incrementing the matching count of a particular module based on the relatedness of the module to the identified user actions. The matching counts of the respective modules are then compared so as to identify those modules that are most likely to appeal to the user. For example, a category/subcategory pair is first determined for each user action. Next, all information modules having the identified category/subcategory pairs mapped to their respective rule sets are identified, and a matching count for each of these modules is incremented accordingly. Finally, these matching counts are scrutinized and used to identify one or more modules of greatest potential interest to the user.

Once module recommendation unit 610 generates information module recommendation 620, an embodiment provides that information module recommendation 620 is accessed by or communicated to a user. In this manner, module recommendation unit 610 is able to access data associated with a user, such as user data 630, analyze the acquired data utilizing matching criteria 640, and recommend an information module to the user based on the performed analysis of this data.

Pursuant to one example, module recommendation unit 610 may be present within or external to the electronic device utilized by the user. In either case, module recommendation unit 610 performs its functions while the user continues to interact with the electronic device in a normal fashion. Once generated, information module recommendation 620 is provided to the electronic device, which presents information module recommendation 620 to the user. In this manner, first exemplary information module recommendation system 600 provides a fully-automated module recommendation system, wherein the user interacts with an electronic device, and these interactions are tracked by module recommendation unit 610 so as to tailor the module recommendation process to the specific interests and/or propensities of the particular user.

Figure 7:
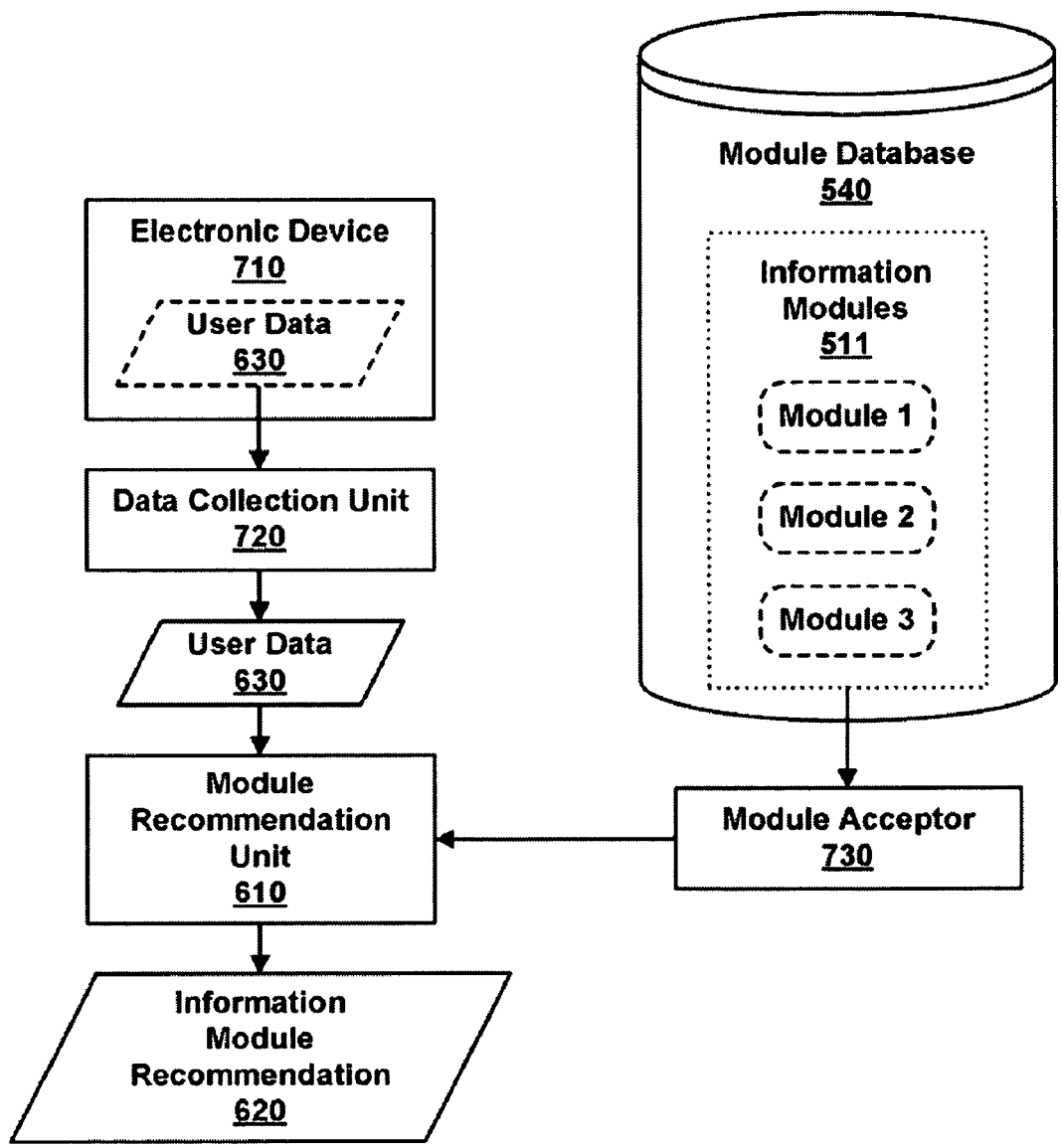
FIG. 7 is a block diagram of a second exemplary information module recommendation system used in accordance with an embodiment of the present technology.

With reference now to FIG. 7, a second exemplar), information module recommendation system 700 in accordance with an embodiment is shown. Module recommendation unit 610 is coupled with a data collection unit 720 and a module acceptor 730. Data collection unit 720 is configured to collect data of interest to module recommendation unit 610, such as user data 630, and then provide this data to module recommendation unit 610 such that module recommendation unit 610 is able to process the data. Similarly, module acceptor 730 acquires one or more information modules, such as information modules 511 stored in module database 540, and provides these modules to module recommendation unit 610 in response to a module request. In this manner, data collection unit 720 and module acceptor 730 function as gateways to data utilized during the matching process.

In an embodiment, data collection unit 720 collects user data 630, wherein user data 630 is associated with a use of an electronic device 710. Consider the example where the use of electronic device 710 includes an interaction of the user with an application running on electronic device 710. Data collection unit 720 is a software component configured to track operations of and/or identify user interactions with such application. Moreover, data collection unit 720 analyzes this data in order to identify user data 630. Data collection unit 720 then routes user data 630 to module recommendation unit 610.

In one embodiment, the application running on electronic device 710 is a web browser configured to utilize electronic device 710 to communicate Web content to the user based on an inputted uniform resource locator (URL). For example, each Website visited by a user has an associated URL, and the information available in the URL is utilized by module recommendation unit 610 to identify the information categories and/or subcategories of greatest interest to the user. Moreover, user data 630, which is collected by data collection unit 720, includes or identifies URLs utilized by the Web browser. In this manner, Web pages visited by a user are identified, and this information is provided to module recommendation unit 610 so as to aid module recommendation unit 610 to identify a user's interests and intent.

With reference still to FIG. 7, module acceptor 730 receives information modules 511 from module database 540 and provides information modules 511 to module recommendation unit 610. Each information module from among information modules 511 may be configured to communicate different topic-related information. Thus, an embodiment provides that module recommendation unit requests a specific information module stored in module database 540 based on an information topic associated with the module. Module acceptor 730 then locates this module in response to this request, and routes the module to module recommendation unit 610.

Moreover, pursuant to one example, module recommendation unit 610 utilizes a set of mapping rules, such as matching criteria 640 shown in FIG. 6, to identify one or more specific information modules of interest. Next, module recommendation unit 610 requests one or more of such modules, and module acceptor 730 acquires these modules from module database 540 and routes the modules to module recommendation unit 610. In this manner, module recommendation unit 610 is able to access user data 630 and conduct a mapping of this user data 630 to an information module stored in module database 540 based on an information topic associated with user data 630 and the information module. Module recommendation unit may then recommend the information module to the user in response to the mapping.

With reference still to FIG. 7, module recommendation unit 610 generates information module recommendation 620, wherein information module recommendation 620 includes a recommendation of the identified information module. Pursuant to one embodiment, module recommendation unit 610 recommends a particular information module based on a ranking paradigm. For example, module recommendation unit 610 identifies multiple information subjects, wherein each of these information subjects is associated with at least one information module from among information modules 511. Next, module recommendation unit 610 conducts an assessment of a relatedness of each of these information subjects to an information topic associated with user data 630. Finally, module recommendation unit 610 conducts a ranking of information modules 511 based on this assessment, and generates information module recommendation 620 based on the results of this ranking.

The foregoing notwithstanding, an embodiment provides that the module recommendation process may be updated over time. Consider the example where module recommendation unit 610 generates a recommendation of a particular information module, and subsequently identifies a change in user data 630. For example, the Web content of a user may change over time, and as a result, the user begins to utilize new URLs associated with content that is different than that associated with previously recognized URLs. Module recommendation unit 610 identifies this change in user preference and analyzes a set of newly acquired data to determine information that may be of potential interest to the user in response to this change. Module recommendation unit 610 then dynamically updates its module recommendation in response to the change so as to recommend another module from among the information modules 511 that is associated with this new information.

Consider the example where a user is interested in sports-related news during a specific season, such as basketball season. Once that season has passed, however, the user becomes more interested in following politics. Module recommendation unit 610 identifies that the user has begun to access sports-related content with less frequency, and has begun to access political news content. In response, module recommendation unit 610 will stop recommending a sports-related information module to the user and will instead identify and recommend a new module configured to provide access to information content of a political nature.

Moreover, in one embodiment, module recommendation unit 610 is further configured to provide a user with one or more information modules, such as when a user accepts a particular module recommendation. Consider the example where module recommendation unit 610 communicates information module recommendation 620 to the user of electronic device 710. Next, module recommendation unit 610 receives an acceptance of information module recommendation 620 and utilizes electronic device 710 to provide the information module to the user in response to the received acceptance.

To further illustrate, an example provides that the accepted information module is delivered to electronic device 710, wherein the module is graphically represented in a graphical user interface integrated with electronic device 710 Therefore, pursuant to one embodiment module recommendation unit 610 may be used to update a user's information portal by providing one or more information modules to the user.

Figure 8:
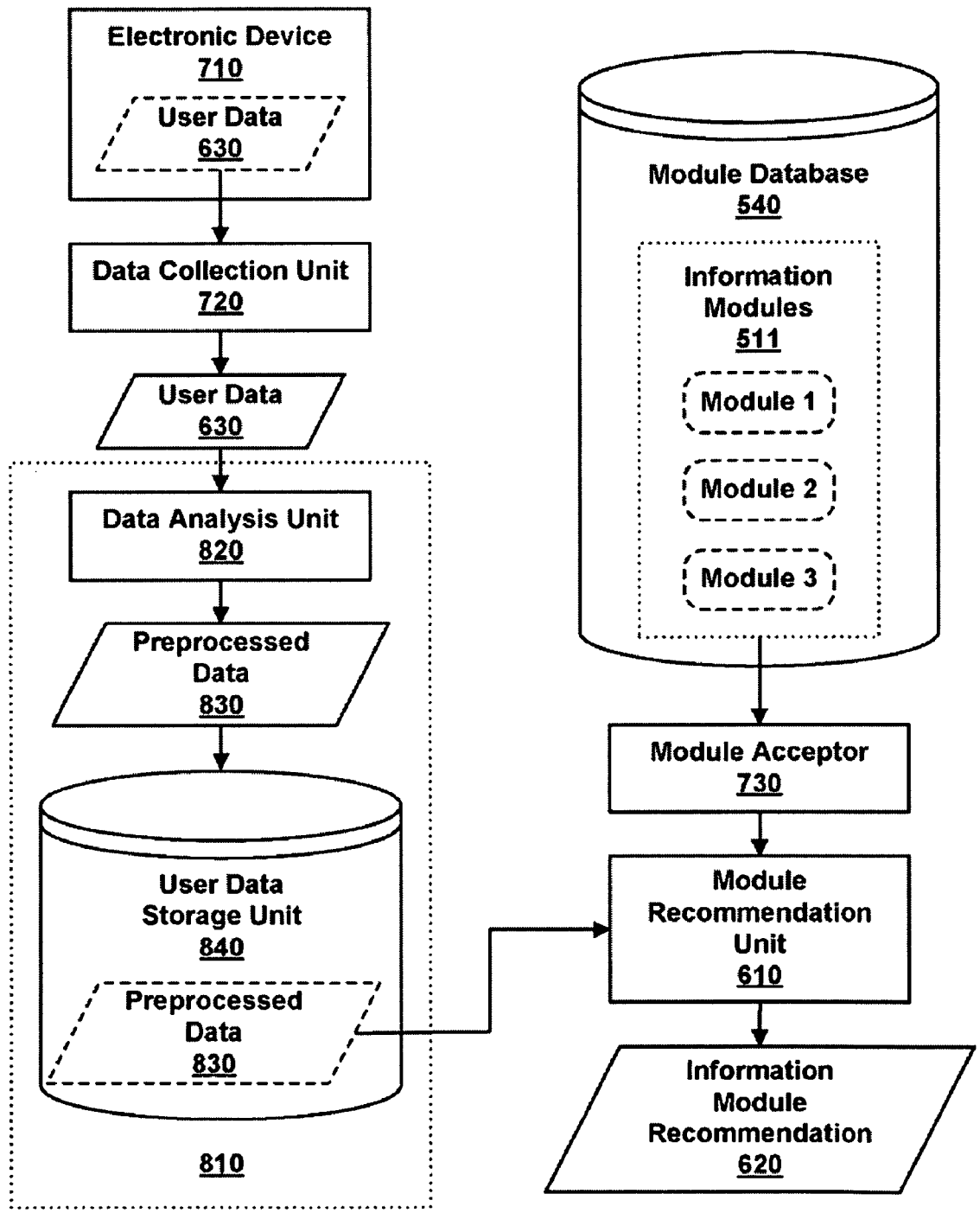
FIG. 8 is a block diagram of a third exemplary information module recommendation system used in accordance with an embodiment of the present technology.

With reference now to FIG. 8, a third exemplary information module recommendation system 800 in accordance with an embodiment is shown. Third exemplary information module recommendation system 800 includes a preprocessing stage 810 wherein a data analysis unit 820 preprocesses user data 630 prior to the matching process executed by module recommendation unit 610.

For example, data analysis unit 820 is communicatively coupled with data collection unit 720 so as to receive user data 630 from data collection unit 720. Data analysis unit 820 preprocesses this data so as to create-preprocessed data 830, which includes information from user data 630 as well as other information that is useful to module recommendation unit 610 during the matching process.

To further illustrate, consider the example where a Web browser is run using electronic device 710, wherein the Web browser utilizes electronic device 710 to communicate Web content to a user based on an inputted URL. User data 630 includes or identifies URLs utilized by the web browser, and preprocessing stage 810 identifies these URLs upon receiving user data 630. These URLs are then used to identify or analyze Web content accessed by electronic device 710.

Moreover, in an embodiment, data analysis unit 820 functions as a URL categorizer. Data analysis unit 820 accesses the URLs, identifies a content of each of the URLs, categorizes the URLs based on the content, and makes the categorized URLs available to module recommendation unit 610 such that module recommendation unit 610 is able to generate the matching criteria based on the aforementioned categorization.

Different methods of processing this URL-related information may be implemented. For example, a semantic analysis of the contents of a Web page corresponding to an identified URL may be conducted so as to identify specific information content of interest to the user. In this manner, the URL is utilized as a link to other content that is to be scrutinized in preprocessing stage 810.

In an alternative embodiment, however, information within the URL itself may be analyzed. For example, when a specific URL is identified, data analysis unit 820 categorizes the URL according to a particular content category and/or subcategory thereof. This categorization of various URLs identified by data analysis unit 820 is ultimately used by module recommendation unit 610 to locate an information module of potential interest to the user.

To illustrate, a bottom-up approach is implemented pursuant to an embodiment, wherein one or more descriptive or identifying terms associated with an information module is found to correspond with one or more terms found in a URL. Consider the example where a user accesses a URL that includes the trademarked name of a known electronics manufacturer. Module recommendation unit 610 will identify that a high probability exists that the user is currently interested in purchasing one or more electronic products. In response, module recommendation unit 610 will conduct a search for modules associated with descriptive terms such as "electronics", "products", "vendors", etc. Module recommendation unit 610 will then identify and recommend an information module that includes links to Web pages associated with various vendors of electronic products.

Alternatively, an embodiment provides that a top-down approach may be implemented, wherein module recommendation unit 610 begins with the available information categories and drills down to the subcategories of the matched information categories. For example, module recommendation unit 610 analyzes the unique identifiers of each available information module to identify a module having the identifier "electronics". Module recommendation unit 610 then analyzes the information subcategories associated with this information module to determine whether the module is designed to provide access to information content pertaining to the vending of various electronic products.

Although exemplary methods of URL categorization are described herein, the present technology is not limited to these examples. Indeed, one or more other categorization schemes may also be implemented. In addition, an embodiment provides that multiple categorization schemes may be simultaneously implemented. For example, both of the aforementioned bottom-up and top-down approaches may be simultaneously implemented so as to increase the efficiency of a particular categorization process. Moreover, in so much as it is possible for a single URL to belong to multiple category/subcategory pairs, either of these approaches may yield zero or more category/subcategory pairs.

Thus, an embodiment provides that a user's interests may be identified by analyzing the information available in a URL. This method of data analysis may be performed in place of, or in addition to, an analysis of the contents of individual Web pages. However, an embodiment provides that the performance time associated with a data analysis is decreased when module recommendation unit 610 is able to generate information module recommendation 620 based on a reduced amount of information. In particular, the recommendation process becomes faster when the information that module recommendation unit 610 processes is minimized, such as when module recommendation unit 610 is able to base a recommendation upon information provided in a URL rather than accessing and analyzing multiple portions of information contained in a Web page associated with the URL.

The foregoing notwithstanding, in an embodiment, data analysis unit 820 analyzes user data 630 to identify a user behavior associated with the user, and generates behavioral data based on the user behavior. Consider the example where user data 630 details a user's behavior while accessing Web content by means of a Web browser application. Data analysis unit 820 analyzes this Web-based user behavior and categorizes the behavioral data into an ontology. Moreover, as stated above, information modules function as portals of specialized functions having an associated set of rules. Thus, the categorization of this Web-related behavior enables module recommendation unit 610 to evaluate these rules in the context of a particular user's Web-related behavior so as to identify the most relevant modules with respect to these behavioral patterns.

Moreover, in one embodiment, a single machine is used by multiple users, and each of these users has a different behavioral pattern that the user exhibits when using this machine. Data analysis unit 820 recognizes these different behavioral patterns and creates a different user profile based on each identified behavioral pattern. In addition, when a new user accesses the machine, data analysis unit 820 will recognize that a user profile has not yet been created for the new user based on the user's behavior, and in response, data analysis unit 820 generates a new profile associated with the new user. These user profiles are then compiled and stored such that they may be accessed at a future time.

With reference still to FIG. 8, preprocessed data 830 is stored in a storage unit 840, which is coupled with module recommendation unit 610. When module recommendation unit 610 is ready to begin the matching process, module recommendation unit 610 accesses preprocessed data 830 in storage unit 840.

Consider the example where storage unit 840 is a behavioral database used to store behavioral data associated with the user. Storage unit 840 receives the behavioral data from data analysis unit 820 and stores this data such that the behavioral data is accessible to module recommendation unit 610. Module recommendation unit 610 subsequently accesses the behavioral data in storage unit 840 and applies a set of mapping rules, such as matching criteria 640, based on the accessed user behavior.

In an embodiment, a single machine is used by multiple users, and data analysis unit 820 generates a different user profile for each of these users. These user profiles are then stored in storage unit 840 such that they may be subsequently accessed by module recommendation unit 610. When data analysis unit 820 identifies that the behavior of a current user is linked to a particular user profile that has already been generated, data analysis unit 820 communicates the user identification to module recommendation unit 610. In response, module recommendation unit 610 accesses the user profile associated with the identified user in storage unit 840 and recommends a particular information module based on the behavioral pattern of the current user. In this manner, an embodiment provides for dynamic user identification and user-customized module recommendation.

Thus, preprocessing stage 810 is used to preprocess user data 630 so as to aid module recommendation unit 610 during the matching process. In so much as user data 630 has already been preprocessed into a useful information mapping format the speed with which module recommendation unit is able to carry out the mapping and recommendation processes is increased. Therefore, the preprocessing of user data 630 provides a means of increasing the speed and efficiency of the overall module recommendation process.

The foregoing notwithstanding, an embodiment provides that preprocessed data 830 is removed from storage unit 840 after a certain period of time. For example, old user profiles, or behavioral histories, associated with users that no longer access a particular machine are identified as no longer being useful to the module recommendation process. This data is then deleted so as to free up storage space within storage unit 840.

Moreover, in one embodiment, old user data associated with a current user is removed or deleted, and a previously generated module recommendation is adjusted based on a newer set of user data associated with the user. In this manner, module recommendations may be continually updated and tailored based on a particular user as well as temporal changes in the user's behavior over time.

Although various exemplary systems and components thereof have been described herein, the present technology is not limited to these systems or components. Moreover, one or more of the aforementioned systems, or components thereof, may exist within or external to a device utilized by a user.

For example, and with reference again to FIGS. 5 and 7, module recommendation unit 610, data collection unit 720, module acceptor 730, and/or module database 540 are located within electronic device 710, while module publisher 510 is located externally to electronic device 710. Electronic device 710 is communicatively coupled with module publisher 510 over an information network, such as the Internet, and module publisher 510 uses this network to transmit newly developed information modules to module database 540. In this manner, module database 540, which is hosted by or located within electronic device 710, may be continuously updated by an external module publishing system.

Moreover, in an embodiment, module recommender 610 is a component of a software program that is downloaded to electronic device 710 over an information network. Specifically, this software program is stored in a magnetic and/or electronic storage unit utilized by electronic device 710. Electronic device 710 accesses this software program and utilizes module recommendation unit 610 to run one or more iterations of the aforementioned module recommendation process based on a substance of user data 630.

In addition, although user data 630 is collected from electronic device 710, an embodiment provides that the substance of user data 630 is kept confidential. With reference again to FIG. 7, an example provides that data collection unit 720 and module recommendation unit are located eternally to electronic device. In particular, data collection unit 720 and electronic device 710 are communicatively coupled over a communication network, such as the Internet. Data collection unit 720 accesses user data 630 over this network and forwards user data 630 to module recommendation unit 610 such that module recommendation unit 610 is able to initiate the module recommendation process. However, user data 630 is not disclosed to third parties, such as third partly vendors. In this manner, the confidentiality of a user's personal information may be protected from unauthorized access to such information.

Pursuant to one embodiment, module recommender 610 is a component of a software program that may be downloaded to electronic device 710 over an information network. A user associated with electronic device 710 agrees to download this software package to electronic device 710 in consideration or a provider of this software package providing a guarantee that the downloaded software will not disclose information collected from electronic device 710 to third parties. For example, a confidentiality agreement could be embedded in an end user license agreement (EULA) that the user enters into when agreeing to download this software package.

In an alternative embodiment, the software is hosted by an external server, and the provider of this software agrees to maintain the confidentiality of any information that is collected from those parties who choose to interact with the externally hosted software. For example, the software could be hosted by an external Web server, and a Web page acting as a portal to this software could contain the terms of a confidentiality agreement and/or express guarantees of the software provider related to the maintained confidentiality of obtained user information.

Figure 9:
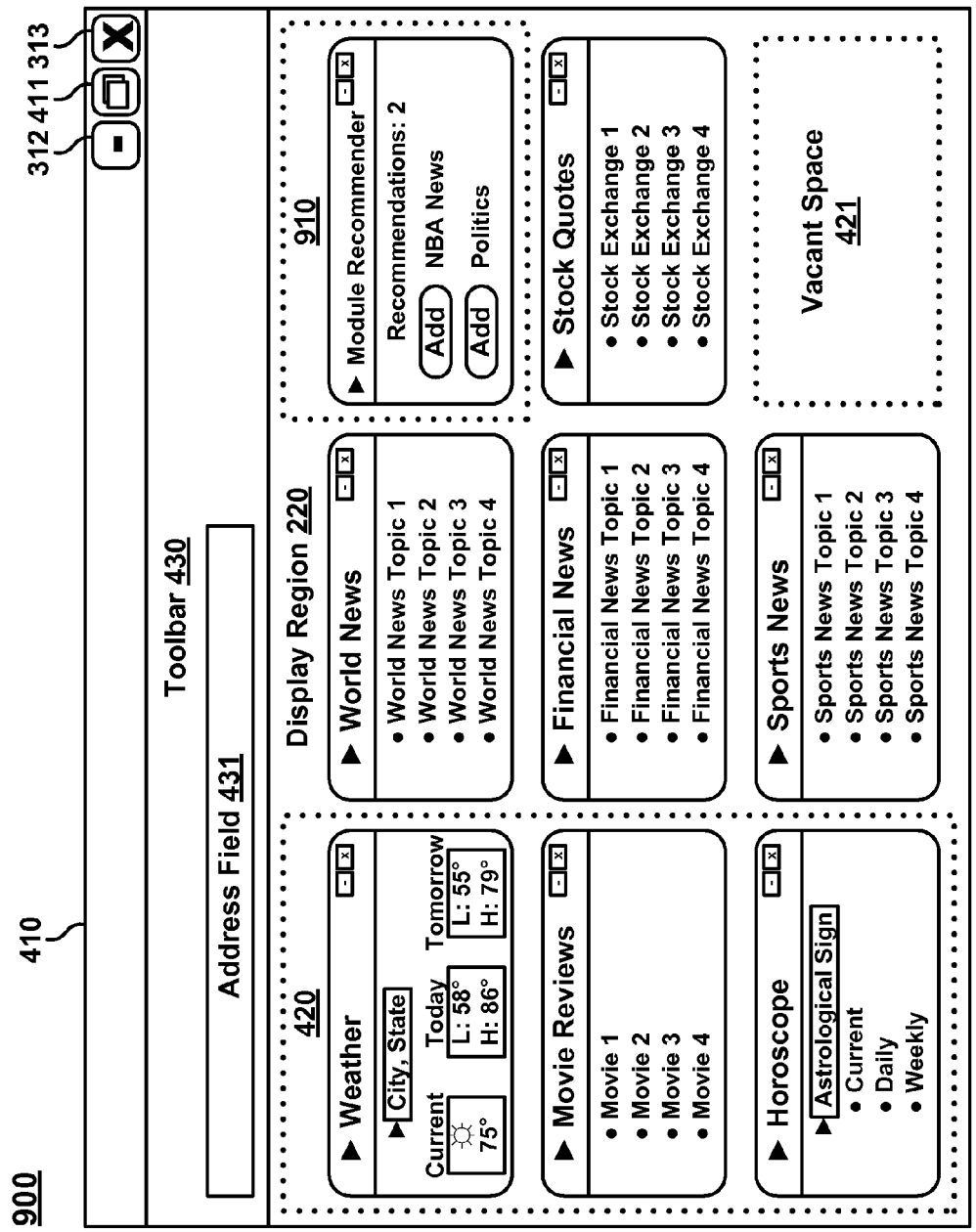
FIG. 9 is a diagram of a second exemplary display configuration used in accordance with an embodiment of the present technology.

With reference now to FIG. 9, a second exemplary display configuration 900 in accordance with an embodiment is shown. Second exemplary display configuration 900 includes software application window 410, which functions as a gateway between a user and one or more information modules. A module recommender 910 has been added to display region 220, wherein module recommender 910 is a graphical information module used to recommend other information modules to a user of software application window 410.

Pursuant to one example, and with reference to the illustrated embodiment, it has been ascertained that a user is interested in information content related to professional basketball events and national politics. In response, two information modules of potential interest to the user are identified that are configured to provide information pertaining to these topics, and module recommender 910 communicates to the user that two recommendations are pending. Moreover, these two modules, labeled "NBA News" and "Politics", respectively, are recommended to the user using module recommender 910, and the user is presented with the option of adding one or both of these information modules to display region 220 by selecting an "Add" button located next to the modules' respective label.

Moreover, pursuant to one embodiment, once a module has been recommended and is either accepted or rejected by the user, module recommender 910 still not recommend the module to the user a second time. In this manner, the user is not forced to continuously reject a module that the user does not wish to add to the portal page, and the user is not offered modules that already are present within the information portal.

Thus, module recommender 910 functions as a user interface for recommending information modules for the user to use in an information portal. In this manner, a predictive portal is obtained that aims to provide users with a custom page that is tailored to the users needs.

Figure 10:
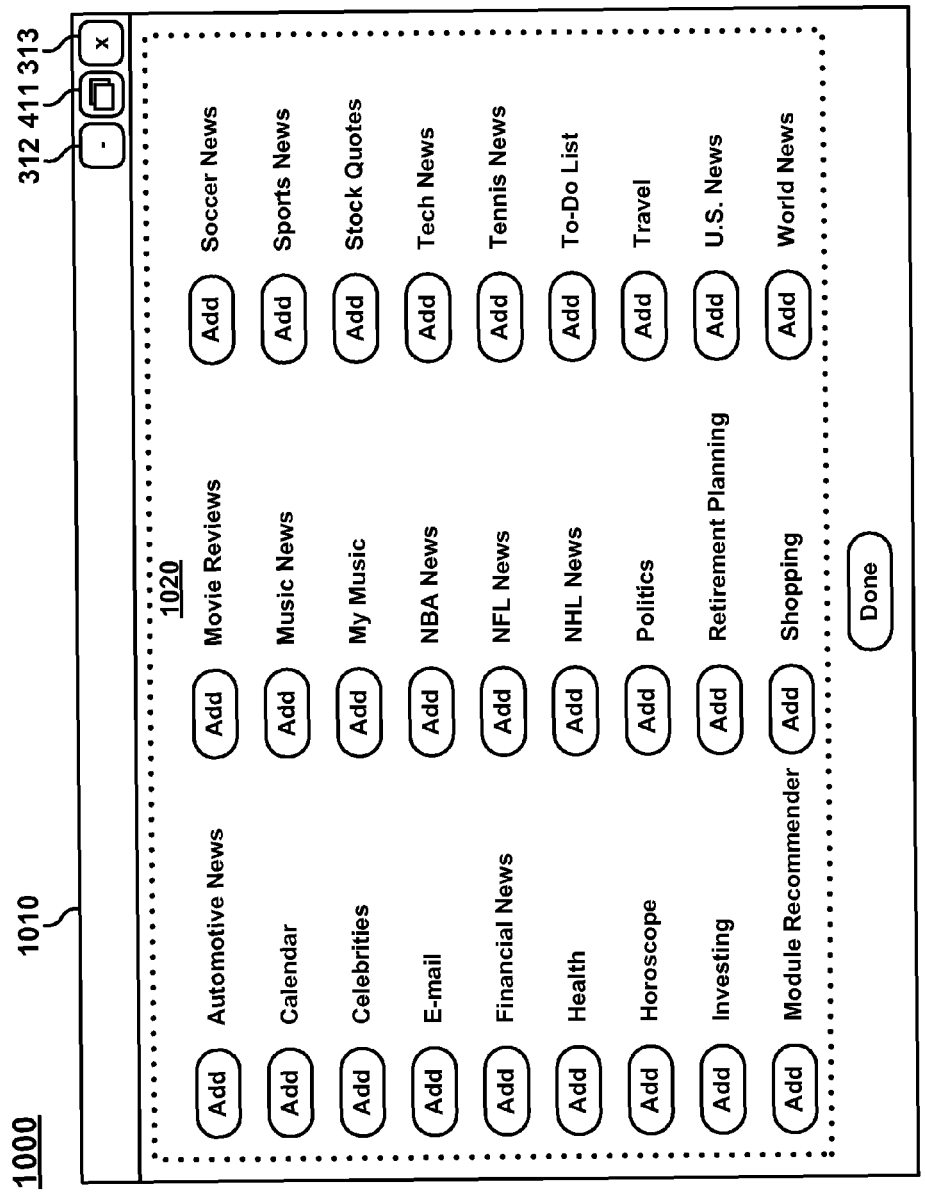
FIG. 10 is a diagram of an exemplary information listing used in accordance with an embodiment of the present technology.

With reference now to FIG. 10, an exemplary information listing 1000 in accordance with an embodiment is shown. A module listing portal 1010 includes a listing 1020 of available information modules. A user is presented with the option of adding one or more of these available information modules to a user interface, such as in display region 220 of FIG. 9.

For example, a user accesses module listing portal 1010, and finds that an information module is available that is designed to provide access to information pertaining to "Automotive News". The user clicks an "Add" button located next to the label "Automotive News", and the corresponding information module is added to the user interface, such as in vacant space 421 located within display region 220.

In one embodiment, and with reference again to FIG. 5, module listing portal 1010 is integrated with module publisher 510. For example, once module publisher 510 has generated or published information modules 511, this information is communicated to module listing portal 1010. In response, module listing portal 1010 lists information modules 511 in listing 1020.

Thus, pursuant to an embodiment, module listing portal 1010 is used to list information modules that are newly generated or published. Moreover, listing 1020 may be periodically updated with new information such that the information presented in listing 1020 remains current and up-to-date.

With reference again to FIG. 10, an information module labeled "Module Recommender" is presented in listing 1020. Therefore, an embodiment provides that module listing portal 1010 is utilized by a user to add module recommender 910 to display region 220, as shown in FIG. 9. The user also has the option of adding one or more other modules from listing 1020. In this manner, a user may then utilize the automated module recommendation capabilities of module recommender 910 while also manually customizing display region 220 using module listing portal 1010.

Exemplary Computer System Environment

Figure 11:
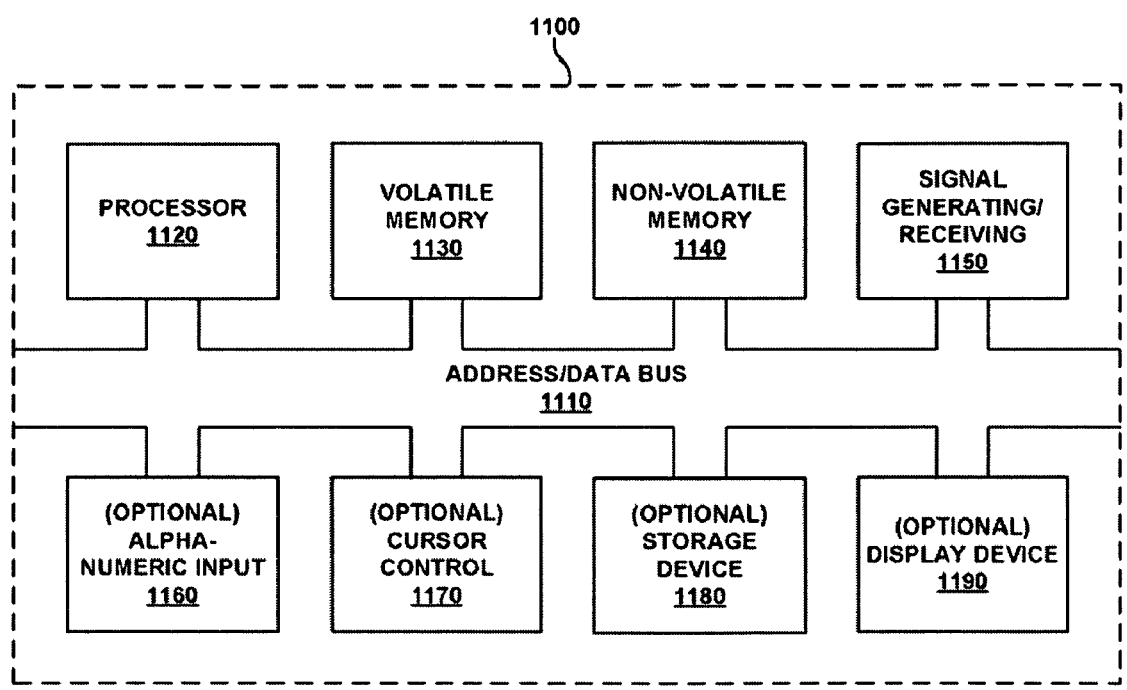
FIG. 11 is a block diagram of an exemplary computer system used in accordance with an embodiment of the present technology.

With reference now to FIG. 11, an exemplary computer system 1100 in accordance with an embodiment is shown. Computer system 1100 may be well suited to be any type of computing device (e.g., a computing device utilized to perform calculations, processes, operations, and functions associated with a program or algorithm). Within the discussions herein, certain processes and steps are discussed that are realized, pursuant to one embodiment, as a series of instructions, such as a software program, that reside within computer readable memos units and are executed by one or more processors of computer system 1100. When executed, the instructions cause computer system 1100 to perform specific actions and exhibit specific behavior described in various embodiments herein.

With reference still to FIG. 11, computer system 1100 includes an address/data bus 1110 for communicating information. In addition, one or more central processors, such as central processor 1120, are coupled With address/data bus 1110, wherein central processor 1120 is used to process information and instructions. In an embodiment, central processor 1120 is a microprocessor. However, the spirit and scope of the present technology is not limited to the use of microprocessors for processing information. Indeed, pursuant to one example, central processor 1120 is a processor other than a microprocessor.

Computer system 1100 further includes data storage features such as a computer-usable volatile memory unit 1130, wherein volatile memory unit 1130 is coupled with address/data bus 1110 and used to store information and instructions for central processor 1120. In an embodiment, volatile memory unit 1130 includes random access memory (RAM), such as static RAM and/or dynamic RAM. Moreover, computer system 1100 also includes a computer-usable non-volatile memory unit 1140 coupled with address/data bus 1110, wherein non-volatile memory unit 1140 stores static information and instructions for central processor 1120. In an embodiment, non-volatile memory unit 1140 includes read-only memory (ROM), such as programmable ROM, flash memory, erasable programmable ROM (EPROM), and/or electrically erasable programmable ROM (EEPROM). The foregoing notwithstanding, the present technology is not limited to the use of the exemplary storage units discussed herein. Indeed, other types of memory may also be implemented.

With reference still to FIG. 11, computer system 1100 also includes one or more signal generating and receiving devices 1150 coupled with address/data bus 1110 for enabling computer system 1100 to interface with other electronic devices and computer systems. The communication interface(s) implemented by one or more signal generating and receiving devices 1150 may utilize wired (e.g., serial cables, modems, and network adaptors) and/or wireless (e.g., wireless modems and wireless network adaptors) communication technologies.

In an embodiment computer system 1100 includes an optional alphanumeric input device 1160 coupled with address/data bus 1110, wherein optional alphanumeric input device 1160 includes alphanumeric and function keys for communicating information and command selections to central processor 1120. Moreover, pursuant to one embodiment, an optional cursor control device 1170 is coupled with address/data bus 1110, wherein optional cursor control device 1170 is used for communicating user input information and command selections to central processor 1120. Consider the example where optional cursor control device 1170 is implemented using a mouse, a track-ball, a track-pad, an optical tracking device, or a touch screen. In a second example, a cursor is directed and/or activated in response to input from optional alphanumeric input device 1160, such as when special keys or key sequence commands are executed. In an alternative embodiment, however, a cursor is directed by other means, such as, for example, voice commands.

With reference still to FIG. 11, computer system 1100, pursuant to one embodiment, includes an optional computer-usable data storage device 1180 coupled with address/data bus 1110, wherein optional computer-usable data storage device 1180 is used to store information and/or computer executable instructions. In an example, optional computer-usable data storage device 1180 is a magnetic or optical disk drive, such as a hard drive, floppy diskette, compact disk-ROM (CD-ROM), or digital versatile disk (DVD).

Furthermore, in an embodiment, an optional display device 1190 is coupled with address/data bus 1110, wherein optional display device 1190 is used for displaying video and/or graphics. In one example, optional display device 1190 is a cathode ray tube (CRT), liquid crystal display (LCD), field emission display (FED), plasma display or any other display device suitable for displaying video and/or graphic images and alphanumeric characters recognizable to a user.

Computer system 1100 is presented herein as an exemplary computing environment in accordance with an embodiment. However, computer system 1100 is not strictly limited to being a computer system. For example, an embodiment provides that computer system 1100 represents a type of data processing analysis that may be used in accordance with various embodiments described herein. Moreover, other computing systems may also be implemented. Indeed, the spirit and scope of the present technology is not limited to any single data processing environment.

Method of Operation

With reference now to FIG. 12, an exemplary method 1200 of information module recommendation in accordance with an embodiment is shown. Method 1200 includes collecting a first set of user information associated with a user from an electronic device associated with the user 1210, and identifying an information topic associated with the first set of user information 1220. Method 1200 further includes accessing a module database that includes multiple information modules 1230, identifying an information module from among the multiple information modules that is configured to deliver information pertaining to the information topic 1240, and recommending the information module to the user 1250.

For example an embodiment provides that an information module recommendation is generated, wherein the recommendation is configured to recommend the aforementioned information module. This recommendation is then communicated to the user. In addition, pursuant to one embodiment, an acceptance of the information module recommendation is received, and the recommended information module is provided to the user in response to receiving such acceptance.

The foregoing notwithstanding, in an embodiment, an information module recommendation is dynamically updated based on newly acquired information. Consider the example where method 1200 further involves collecting a second set of user information associated with the user from the electronic device and identifying a difference between the first and second sets of data. Another information module from among the multiple information modules is then recommended to the user in response to the identifying of the aforementioned difference.

Various methods malt be employed for recommending an information module to a user based on the collected user information. In an embodiment, method 1200 further includes accessing a matching criteria configured to map user information to at least one information module from among the multiple information modules based on an information content associated with such information module. Moreover, this matching criteria is utilized to map the first set of user information to the information module based on the information module being configured to deliver information pertaining to the information topic.

For example, method 1200 may be expanded to include analyzing the first set of user information to identify a user behavior associated with the user based on an interaction of the user with an application running on the electronic device. The matching criteria may then be applied based on the identified user behavior. Alternatively, method 1200 may include identifying URLs utilized by the user, and identifying a content of each of these URLs. The URLs are then categorized based on the identified content, and the matching criteria is applied based on this categorization.

In addition, pursuant to one embodiment, method 1200 involves identifying multiple information subjects, wherein each of these information subjects is associated with al least one information module from among the multiple information modules, and assessing a relatedness of each of these information subjects to the information topic that is associated with the first set of user information. Method 1200 further includes ranking the multiple information modules based on this assessment, and recommending the information module to the user based on the ranking. Thus, the module recommendation process may be configured to utilize both a content analysis and module ranking paradigm.

The above discussion has set forth the operation of various exemplary systems, devices, and methods of operation of embodiments described herein. With reference to FIGS. 1-2, exemplary systems and methods of implementation used by various embodiments have been illustrated and described. In various embodiments, one or more steps of a method of implementation are carried out by a processor under the control of computer-readable and computer-executable instructions. Thus, in some embodiments, these methods are implemented via a computer, such as computer system 1100 of FIG. 11.

In an embodiment, and with reference still to FIG. 11, the computer-readable and computer-executable instructions reside, for example, in data storage features such as computer-usable volatile memory unit 1130, computer-usable non-volatile memory unit 1140, or optional computer-usable data storage device 1180 of computer system 1100. Moreover, the computer-readable and computer-executable instructions, which may reside on computer useable/readable media, are used to control or operate in conjunction with, for example, a data processing unit, such as central processor 1120.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein it is understood that these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method of information module recommendation, said method comprising:

collecting a first set of user information associated with a user from an electronic device associated with said user;

identifying an information topic associated with said first set of user information;

accessing a module database comprising a plurality of information modules;

identifying an information module from among said plurality of information modules configured to deliver information pertaining to said information topic;

recommending said information module to said user;

ceasing future recommendations of said information module if a rejection of said recommended information module is received;

automatically recognizing different behavioral patterns for different users of said electronic device, wherein a first user is identified based on a behavior pattern of the first user and a second user is identified based on a behavior pattern of the second user; and automatically recommending different information modules to said respective different users based on each of said different users' behavioral patterns when each of said different users is a current user of said electronic device, wherein one of said recommended information modules is recommended to said first user when said first user is the current user and another one of said recommended information modules is recommended to a second user when said second user is the current user and wherein said recommended information modules enable a minimize operation to be performed on displayed graphical representations of said recommended information modules.

2. The method of claim 1, further comprising:

accessing a matching criteria configured to map user information to at least one information module from among said plurality of information modules based on an information content associated with said at least one information module; and utilizing said matching criteria to map said first set of user information to said information module based on said information module being configured to deliver information pertaining to said information topic.

3. The method of claim 2, further comprising:

analyzing said first set of user information to identify a user behavior associated with said user based on an interaction of said user with an application running on said electronic device; and applying said matching criteria based on said user behavior.

4. The method of claim 2, further comprising:

identifying uniform resource locators (URLs) utilized by said user;

identifying a content of each of said URLs;

categorizing said URLs based on said content; and applying said matching criteria based on said categorizing.

5. The method of claim 1, further comprising:

identifying a plurality of information subjects, wherein each of said plurality of information subjects is associated with at least one information module from among said plurality of information modules;

assessing a relatedness of each of said plurality of information subjects to said information topic;

ranking said plurality of information modules based on said assessing; and recommending said information module to said user based on said ranking.

6. The method of claim 1, further comprising:

generating an information module recommendation configured to recommend said information module;

communicating said information module recommendation to said user;

receiving an acceptance of said information module recommendation; and providing said information module to said user in response to said receiving of said acceptance.

7. The method of claim 1, further comprising:

collecting a second set of user information associated with said user from said electronic device;

identifying a difference between said first and second sets of user information; and recommending another information module from among said plurality of information modules to said user in response to said identifying of said difference.

8. A non-transitory computer readable storage medium having computer readable program code embedded therein for recommending an information module to a user of an electronic device, said program code comprising:

a data collection unit for collecting user data associated with a use of said electronic device;

a module acceptor for receiving information modules from a module database, wherein each of said information modules is configured to communicate different topic-related information;

a module recommendation unit coupled with said data collection unit and said module acceptor, said module recommendation unit accessing said user data, utilizing a matching criteria to conduct a mapping of said user data to an information module stored in said module database based on an information topic associated with said user data and said information module, recommending said information module to said user in response to said mapping, and ceasing future recommendations of said information module if a rejection of said recommended information module is received by said module recommendation unit; and said module recommendation unit configured for automatically recognizing different behavioral patterns for different users of said electronic device, wherein a first user is identified based on a behavior pattern of the first user and a second user is identified based on a behavior pattern of the second user, and configured for automatically recommending information modules to said respective different users based on each of said different users' behavioral patterns when each of said different users is a current user of said electronic device, wherein one of said recommended information modules is recommended to said first user when said first user is the current user and another one of said recommended information modules is recommended to a second user when said second user is the current user and wherein said recommended information modules enable a minimize operation to be performed on displayed graphical representations of said recommended information modules.

9. The non-transitory computer readable storage medium of claim 8, further comprising:

a data analysis unit coupled with said data collection unit, said data analysis unit receiving said user data from said data collection unit, analyzing said user data to identify a user behavior associated with said user, and generating behavioral data based on said user behavior.

10. The non-transitory computer readable storage medium of claim 9, further comprising:

a behavioral database coupled with said data analysis unit and said module recommendation unit, said behavioral database receiving said behavioral data from said data analysis unit and storing said behavioral data such that said behavioral data is accessible to said module recommendation unit.

11. The non-transitory computer readable storage medium of claim 9, wherein said module recommendation unit accesses said behavioral data in a behavioral database and applies said matching criteria based on said user behavior.

12. The non-transitory computer readable storage medium of claim 8, wherein said use of said electronic device comprises an interaction of said user with an application running on said electronic device.

13. The non-transitory computer readable storage medium of claim 12, wherein said application is a Web browser configured to utilize said electronic device to communicate Web content to said user based on an inputted uniform resource locator (URL), and wherein said user data collected by said data collection unit comprises URLs utilized by said Web browser.

14. The non-transitory computer readable storage medium of claim 13, further comprising:

a URL categorizer coupled with said data collection unit and said module recommendation unit, said URL categorizer accessing said URLs, identifying a content of each of said URLs, categorizing said URLs based on said content, and making said categorized URLs available to said module recommendation unit such that said module recommendation unit is able to apply said matching criteria based on said categorizing.

15. The non-transitory computer readable storage medium of claim 8, wherein said module recommendation unit identifies a plurality of information subjects, each of said plurality of information subjects being associated with at least one information module from among said information modules, conducts an assessment of a relatedness of each of said plurality of information subjects to said information topic, conducts a ranking of said information modules based on said assessment, and recommends said information module based on said ranking.

16. The non-transitory computer readable storage medium of claim 8, wherein said module recommendation unit generates a recommendation of said information module, communicates said recommendation to said user, and utilizes said electronic device to provide said information module to said user in response to receiving an acceptance of said recommendation.

17. The non-transitory computer readable storage medium of claim 8, wherein said module recommendation unit generates a recommendation of said information module, identifies a change in said user data, and dynamically updates said recommendation in response to said change such that said recommendation recommends another information module from among said information modules.

18. Instructions on a non-transitory computer-usable storage medium wherein the instructions when executed cause a computer system to perform a method of information module recommendation, said method comprising:

collecting a first set of user information associated with a user from an electronic device associated with said user;

identifying an information topic associated with said first set of user information;

accessing a module database comprising a plurality of information modules;

identifying an information module from among said plurality of information modules configured to deliver information pertaining to said information topic;

generating an information module recommendation configured to recommend said information module;

communicating said information module recommendation to said user; and ceasing future recommendations of said information module if a rejection of said recommended information module is received;

automatically recognizing different behavioral patterns for different users of said electronic device, wherein a first user is identified based on a behavior pattern of the first user and a second user is identified based on a behavior pattern of the second user; and automatically recommending information modules to said respective different users based on each of said different users' behavioral patterns when each of said different users is a current user of said electronic device, wherein one of said recommended information modules is recommended to said first user when said first user is the current user and another one of said recommended information modules is recommended to a second user when said second user is the current user and wherein said recommended information modules enable a minimize operation to be performed on displayed graphical representations of said recommended information modules.

19. The non-transitory computer-usable storage medium of claim 18, wherein said method further comprises:

identifying a plurality of information subjects, wherein each of said plurality of information subjects is associated with at least one information module from among said plurality of information modules;

assessing a relatedness of each of said plurality of information subjects to said topic;

ranking said plurality of information modules based on said assessing; and generating said information module recommendation based on said ranking.

20. The non-transitory computer-usable storage medium of claim 18, wherein said method further comprises:

receiving an acceptance of said information module recommendation; and providing said information module to said user in response to said receiving of said acceptance.

* * * * *